United States Patent Office 3,459,585
Patented Aug. 5, 1969

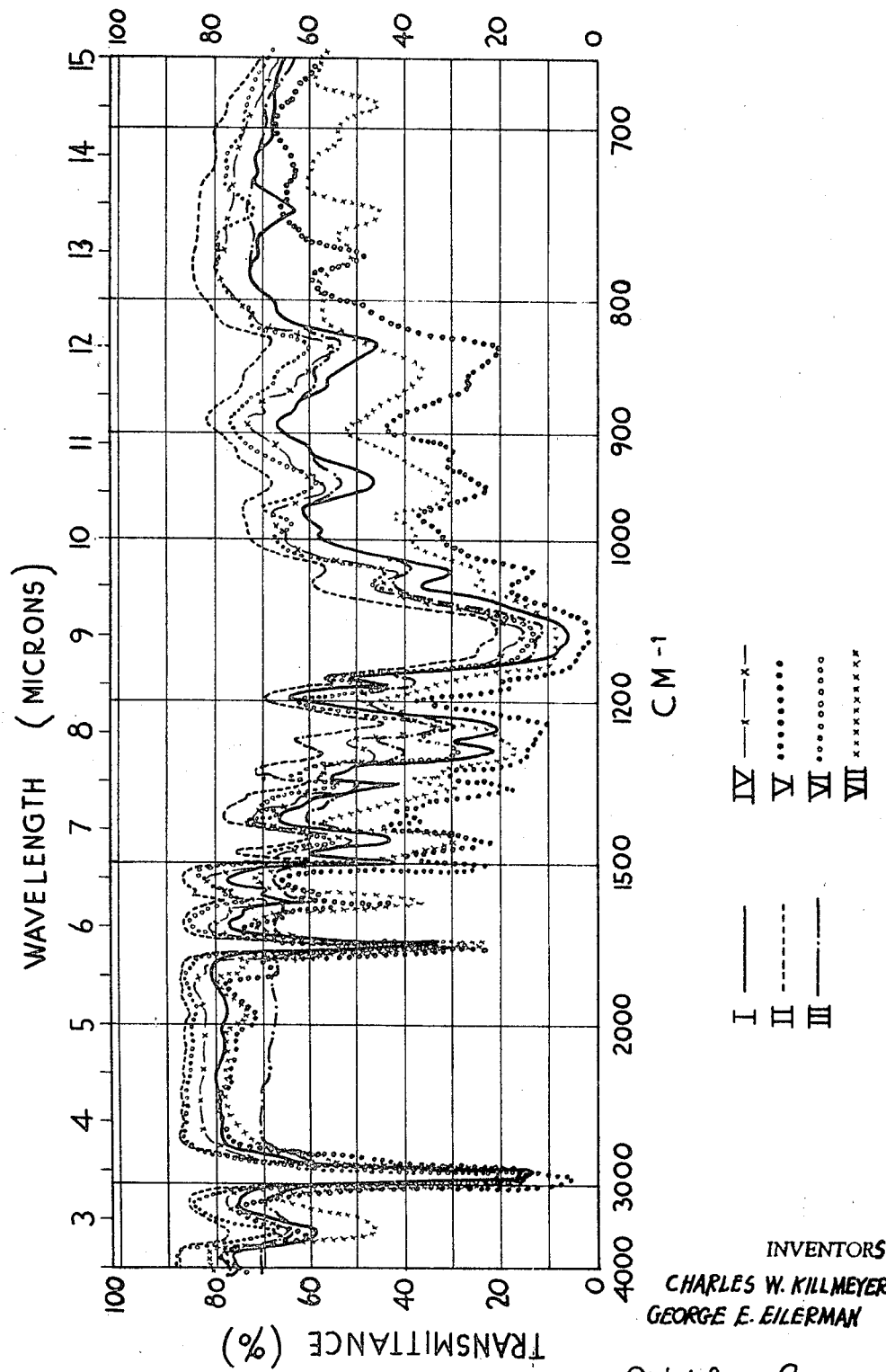

3,459,585
NOVEL REACTION PRODUCT AND USE THEREOF AS A GLASS FIBER SIZE
Charles W. Killmeyer and George E. Eilerman, Pittsburgh, Pa., assignors to PPG Industries, Inc., Pittsburgh, Pa., a corporation of Pennsylvania
Filed Dec. 5, 1966, Ser. No. 599,180
Int. Cl. C03c 25/02; B44d 1/14
U.S. Cl. 117—76     24 Claims

ABSTRACT OF THE DISCLOSURE

A size for treating a glass fiber strand, said size consisting of a reaction product which is obtained by reacting an alkoxylated nitrogen containing compound such as an alkoxylated fatty amine or amide with a polycarboxylic acid and then reacting the resultant product with an epoxide compound. The sized strands can be further coated with an aqueous rubber adhesive composition in preparation for use as reinforcement for resins and rubber.

---

The present invention relates to a glass fiber treatment. The invention particularly relates to a novel size for treating glass fibers which are to be used in various forms as a reinforcement for resinous and rubber products and it is more particularly concerned with a novel material which is useful as a strand forming size ingredient.

A glass fiber strand is composed of a multitude of fine glass filaments which are formed by being drawn at a high rate of speed from molten cones of glass located at the tips of small orifices in a bushing such as shown in U.S. Patent No. 2,133,238. During formation, the filaments are coated while moving at a speed of the order of 5,000 to 20,000 feet per minute with a size which contains a binder to give the strand integrity for workability for any standard textile or reinforcement use. If the strand does not have proper integrity, fuzzing occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers substantive and compatible with the particular resins with which they are to be employed. These coupling agents greatly increase the dry and wet physical strengths of the glass fiber resin laminate.

When the glass fibers are used in the form of strand, i.e., roving or chopped strand or twisted strand, for resin reinforcement, the coupling agent is usually combined with the size and applied with the size to the fibers during their formation. The size employed is usually an aqueous dispersion of a film forming, synthetic binder, and a glass fiber lubricant. Roving is formed by combining a number of strands in parallel form and winding the strands on a tubular support in a manner such that the combined strands may be unwound and used to form woven roving or chopped strands. Twisted strand (single end on a bobbin) is made according to conventional textile twisting techniques by removing the strand from the forming package and winding it on a twister bobbin. It is therefore necessary that the strand have good integrity and resistance to fuzzing during the steps employed to make the twisted strand or roving and fabricate them into forms suitable for use as a resin reinforcement.

It is desired that a treatment be provided for glass fiber strand which will render the strand capable of providing increased strength to glass fiber reinforced resinous and rubber products. For example, it is desired that a strand be provided which is equally useful as a reinforcement for styrenated polyester resins, epoxy resins, natural rubber and synthetic rubbery polymers. It is obvious that such a versatile strand will reduce the storage and inventory problems of both manufacturers and users of the strand.

An object of this invention is to provided glass fiber strand which has been treated with a size with good "wet-out" properties. It is desirable in the formation of glass fiber laminates that the resin completely impregnate the strand and wet the surfaces of the fibers as quickly as possible in order to reduce the time required to make the laminates as well as to provide a laminate with maximum possible strength.

It is another object of this invention to provide a glass fiber strand which is treated with a size and which can be twisted, plied and woven into cloth for use as a resin reinforcement without requiring heat cleaning and finishing of the cloth prior to such use as required when the glass fibers have been formed with a starch containing size.

It is a further object of this invention to provide an improved glass fiber size for use in sizing glass fibers for resin reinforcement which size imparts high physical strengths to glass fiber reinforced resinous articles.

It is an object of this invention to provide a rubber coated glass fiber strand, yarn or textile fabric for reinforcement of rubber. The rubber coated glass fiber reinforcement should adhere well to the rubber matrix at high and low temperatures and should have long life and good strength under severe flexing conditions.

These, and other objects, are accomplished by the practice of this invention which, briefly, comprises treating glass fiber strands during their formation with an aqueous size consisting essentially of about 2 to 15 percent by weight of a reaction product which is obtained by reacting an alkoxylated nitrogen containing compound such as an alkoxylated fatty amine or amide with a polycarboxylic acid and then reacting the resultant product with an epoxide compound. The size may also contain 0.1 to 2.0 percent by weight of a coupling agent and 0.2 to 4 percent by weight of a wetting agent. The aqueous size has a viscosity which has been conventionally found to be suitable for glass fiber strand forming sizes to permit adequate pick-up of size by the strand to obtain strand integrity and prevent destruction of the strand by abrasion of the individual fibers against each other. The size is characterized by the fact that a conventional glass fiber lubricant is not a necessary ingredient in the size.

The novel reaction product is preferably produced by reacting one mole of the alkoxylated nitrogen containing compound with two moles of a polycarboxylic acid. The resulting reaction product is then reacted with two moles of an epoxide compound, preferably a polyepoxide compound. In the above described reaction it is believed that one carboxyl group of each mole of the acid esterifies with one of the terminal hydroxyl groups of the alkoxylated nitrogen containing compound, thereby leaving two carboxyl groups available for further reaction. Each of these carboxyl groups is then esterified by reaction with an epoxy group of the epoxide compound.

The resulting reaction product has epoxy groups available for further reaction when polyepoxide compounds are employed in the reaction. It is also conceivable that the reaction product is composed in part of mixtures of cyclic compounds which might be formed during either the first or second reaction step.

The molecular weight of the reaction product is approximately 1,000 to 20,000. The molecular weight can be determined when a polyepoxide is employed as a reactant by determining the epoxy equivalent by the method of Durbetaki as set forth in volume 28, No. 12, December 1956, of Analytical Chemistry. The molecular weight is then estimated to be about twice the epoxy equivalent. The epoxy equivalent of the reaction product ranges from about 500 to 10,000. The reaction products are waxy solids and are readily soluble or dispersible in one to three times their weight of water.

The alkoxylated amines and amides are commercially available materials which are produced by reaction of an alkylene oxide with a primary fatty amine or amide. The preparation of an alkoxylated amine is shown in U.S. Patent No. 1,970,578, and the preparation of an alkoxylated amide is shown in U.S. Patents Nos. 2,002,613, 2,085,706 and 2,520,381. The preparation of the alkoxylated amides (and the amine) can be accomplished by reacting one mole of the amide (or amine) with 2 to 200 moles of an alkylene oxide in the manner described in the patents. The reaction is usually carried out in an autoclave at a slightly elevated temperature. The alkoxy group can contain one to four carbon atoms, but it is preferably ethoxy or propoxy. Representative structural formulas of the amine and amide are as follows:

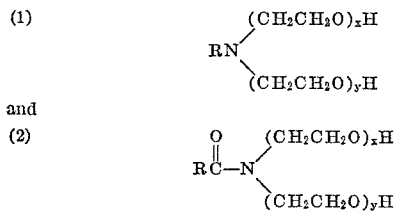

wherein R is a saturated or unsaturated, alkyl, aryl, arylalkyl or alkylaryl radical containing 6 to 18 carbon atoms and $x$ and $y$ are one to 100 or more. R may be substituted by hydroxy or halogen groups. For example, R may be stearyl, benzyl, oleyl, hydroxy stearyl, phenyl, lauryl, dimethyl phenyl, etc. The molecular weight of the alkoxylated amide or amine can vary roughly from 250 to 10,000.

Polycarboxylic acids which may be used in preparing the reaction product include, for example, oxalic, malonic, succinic, glutaric, adipic, pimelic, suberic, azelaic, sebacic, maleic, fumaric, itaconic, citraonic, mesaconic, muconic, 1,2-cyclohexanedicarboxylic, 1,4-cyclohexanedicarboxylic, malic, tartaric, phthalic, isophthalic, terephthalic, tetrahydrophthalic, tetrachlorophthalic and tricarballylic acids and the corresponding known acid anhydrides of the above acids. The term "acids" as used herein and in the claims shall include the acid anhydrides where they exist. For example, alkenyl succinic anhydride and alkyl succinic anhydride, maleic anhydride, phthalic anhydride and combinations thereof can be used. Mixtures of acids can be used in the reaction.

Polycarboxylic acids which may be used in preparing an intermediate polycarboxylic ester which contains more than two unesterified carboxyl groups include hemimellitic, trimellitic, trimesic, prehnitic, mellophanic, pyromellitic, benzene pentacarboxylic, mellitic, citric, aconitic and oxalocitraconic acids. Also included are the adducts, such as Diels-Alder adducts, of maleic, fumaric, chloromaleic, dichloromaleic, itaconic, citraconic, muconic, aconitic and oxalocitraconic acids, and their corresponding anhydrides where such exist, with conjugated and nonconjugated compounds such as rosin, rosin acids, linseed oil, linoleic acid, linolenic acid, eleostearic acid, tung oil, oiticia oil, soybean oil, dehydrated castor oil, alpha terpinene, allocimene, ocimene, myrcene, beta phellandrene and other like materials sometimes known as extenders.

A suitable epoxy compound is one which contains at least one group in which an oxygen atom is attached to adjacent carbon atoms

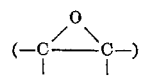

Such compounds are well known in the art and may be either monomeric or polymeric.

One group of polyepoxy compounds which may be used is obtained by the reaction of a stoichiometric excess of an epihalohydrin such as epichlorohydrin with a polyhydric phenol such as bis-(4-hydroxy phenyl)-2,2-propane, bis-(hydroxy phenyl) methane (obtained by the acid condensation of two moles of phenol with one mole of formaldhyde), hydroquinone, resorcinol, etc., or with a polyhydroxy alcohol such as glycol, polyethylene glycol, sorbitol, glycerol, etc. Such compounds are characterized by the presence of terminal epoxy groups. These compounds are further described in U.S. Patents 2,324,483; 2,444,333; 2,494,295; 2,500,600 and 2,511,913 the disclosures of which are incorporated herein by reference. By varying the proportions of the epihalohydrin and the polyhydroxy compound, and/or by varying the reaction conditions, compounds of low, intermediate or higher molecular weights may be produced which range from liquids to solids. Some commercially available compounds of this type and their characteristics are listed below:

| Resin | Epoxide equivalent | Approximate molecular weight | Viscosity, (poises) | Melting point, °C. |
|---|---|---|---|---|
| Epon 812 | 140–160 | 306 | 1–2 | Liquid |
| Epon 826 | 180–188 | 360 | 65–95 | Liquid |
| Epon 828 | 192 | 390 | 100–160 | 8–12 |
| Epon 834 | 230–280 | 470 | 4–9 | 20–28 |
| Epon 1001 | 425–550 | 900 | Solid | 64–76 |
| Dow 331 | 186–192 | 390 | 111–140 | Liquid |
| Dow 2337 | 374–415 | 800 | 200 | Liquid |

Other polyepoxy compounds which may be used include epoxylated novolaks, epoxidized polyolefins, epoxidized polybutadiene and other epoxidized diene polymers, butadiene diepoxide, diglycidyl esters of dicarboxylic acid (e.g., diglycidyl phthalate), etc.

A preferred class of compounds which contains more than one epoxy group per molecule comprises diepoxy compounds containing at least one fused ring epoxy group, i.e., at least one of the epoxy groups being attached to adjacent carbon atoms which are located in a carbocyclic structure. Representative examples of such compounds and U.S. patents which disclose these compounds are listed below. The disclosures of all of the cited U.S patents are incorporated herein by reference.

I. Compounds having the general formula:

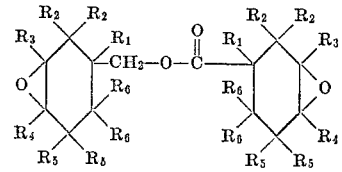

wherein $R_1$, $R_2$, $R_3$, $R_4$, $R_5$ and $R_6$ represents a hydrogen atom or an aliphatic hydrocarbon radical. Examples of such compounds, which are disclosed in United States Patent 2,716,123, include 3,4-epoxycyclohexylmethyl-3,4-epoxycyclohexanecarboxylate;

3,4-epoxy-1-methylcyclohexylmethyl-3,4-epoxy-1-methylcyclohexanecarboxylate;

3,4-epoxy-2-methylcyclohexylmethyl-3,4-epoxy-2-methylcyclohexanecarboxylate;

3,4-epoxy-6-methylcyclohexylmethyl-3,4-epoxy-6-methylcyclohexanecarboxylate;

3,4-epoxy-3-methylcyclohexylmethyl-3,4-epoxy-3-methylcyclohexanecarboxylate; and 3,4-epoxy-4-methylcyclohexylmethyl-3,4-epoxy-4-methylcyclohexanecarboxylate.

II. Compounds having the general formula:

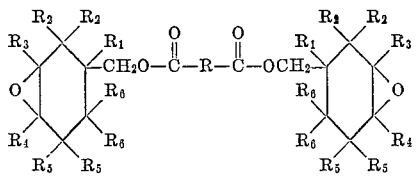

in which $R_1$, $R_2$, $R_3$, $R_4$, $R_5$ and $R_6$ represent a hydrogen atom or an alkyl radical and R represents a divalent aliphatic hydrocarbon radical. Examples of such compounds, which are disclosed in United States Patent 2,750,395, include bis-(3,4-epoxycyclohexylmethyl)maleate;
bis-(3,4-epoxycyclohexylmethyl) pimelate;
bis-(3,4-epoxy-6-methylcyclohexylmethyl) maleate;
bis-(3,4-epoxy-6-methylcyclohexylmethyl) succinate;
bis-(3,4-epoxycyclohexylmethyl) terephthalate;
bis-(3,4-epoxycyclohexylmethyl) oxalate;
bis-(3,4-epoxycyclohexylmethyl) succinate; and
bis-(3,4-epoxy-6-methylcyclohexylmethyl) adipate.

III. Bis-epoxycyclopentanyl ether which has the formula:

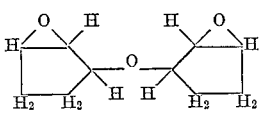

The preparation of this compound is disclosed in United States Patent 2,739,161.

IV. Compounds having the general formula:

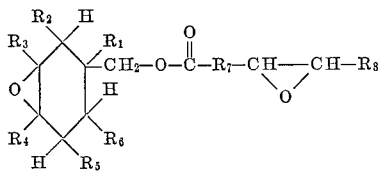

wherein the radicals $R_1$ through $R_6$ represent hydrogen atoms or alkyl groups, $R_7$ is an alkylene chain containing from 1 to 15 carbon atoms, and $R_8$ represents a hydrogen atom or an alkyl radical containing from 1 to 14 carbon atoms, the total number of carbon atoms in $R_7+R_8$ being from 7 to 15 carbon atoms. Examples of such compounds, which are disclosed in United States Patent 2,786,066, include 3,4-epoxycyclohexylmethyl 9,10-epoxymyristate;
3,4-epoxycyclohexylmethyl 9,10-epoxypalmitate;
3,4-epoxycyclohexylmethyl 9,10-epoxystearate;
3,4-epoxy-1-methylcyclohexylmethyl 9,10-epoxystearate; and
3,4-epoxy-6-methylcyclohexylmethyl 9,10-epoxystearate.

V. Compounds having the general formula:

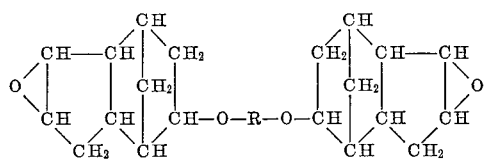

in which R is the radical of a glycol, HO·R·OH, such as ethylene glycol, or of a polyalkylene glycol,

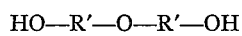

such as diethylene glycol such as disclosed in United States Patent 2,543,419.

VI. Compounds having the general formula:

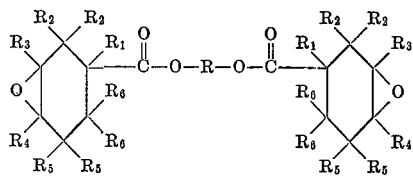

Such compounds are disclosed in United States Patents 2,745,847; 2,853,498 and 2,853,499. Some specific examples of these compounds include ethylene glycol bis-(3,4-epoxycyclohexanecarboxylate);
3-methyl-1,5-pentanediol bis-(3,4-epoxycyclohexane-
   carboxylate);
1,5-pentanediol bis-(3,4-epoxycyclohexanecarboxylate);
1,6-hexanediol bis-((3,4-epoxycyclohexanecarboxylate);
2-methoxymethyl-2,4-dimethyl-1,5-pentanediol bis-(3,4-
   epoxycyclohexanecarboxylate);
diethylene glycol bis-(6-methyl-3,4-epoxycyclohexane-
   carboxylate);
diethylene glycol bis-(3,4-epoxycyclohexanecarboxylate);
and triethylene glycol bis-(3,4-epoxycyclohexanecarbox-
ylate).

Other diepoxy compounds having at least one fused ring epoxy group include limonene diepoxide

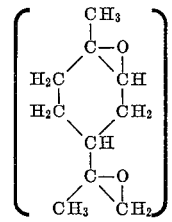

1,2,5,6-diepoxycyclooctane

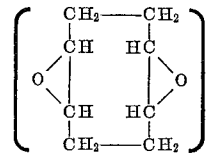

dicyclopentadiene diepoxide

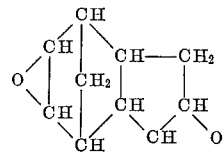

and vinylcyclohexene diepoxide

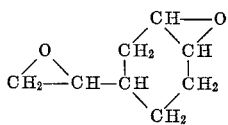

The reaction between the alkoxylated nitrogen containing compound and the polycarboxylic acid results in an intermediate reaction product having a molecular weight of approximately 300 to 11,000. The intermediate reaction product has an acid number of 20 to 300. The reactants are preferably reacted in a proportion of one mole of alkoxylated nitrogen containing compounds to two moles of polycarboxylic acid. Less than two moles of acid can be present, however, an excess of two moles should be avoided for the excess acid acts as an undesirable catalyst to gel the epoxy compound in the subsequent reaction.

The reaction between the epoxide compound and the ester of the polycarboxylic acid and the alkoxylated amine or amide can be conducted under various conditions. No catalyst is necessary to effect the reaction and it is preferred that none be present. However, the reaction proceeds more rapidly when heated. Proportions of reactants are not critical. It has been found convenient to use at least one mole of polyepoxide compound per unesterified carboxyl group per mole of the ester. When the reaction is carried out at elevated temperatures, i.e., 150 to 200° C., the reaction can be completed in a few minutes. Longer heating at these temperatures causes some additional reaction between oxirane groups and thereby causes the overall molecular weight of the reaction product to increase. For example, the reaction between the polyepoxy compound and the acid reaction product can proceed for 3 hours at 200° C. with only 10 to 50 percent increase in the overall molecular weight of the resulting reaction product. Some improvement in the twisting and handling of sized strand is noted with the higher molecular weight products, however, the increased cost of reaction over the longer period of time must be measured against the value of the improvement noted in the handling characteristics of the sized glass fiber strand. Limited heating at elevated temperatures provides a reaction product which is satisfactory for most applications of the sized yarn or roving.

The following examples illustrate the preparation of various reaction products which can be used in the practice of this invention. In these examples, the reactants are mixed in a three-necked flask fitted with a stirrer, a $CO_2$ bubbler, a water trap condenser and a thermometer. The alkoxylated amine or amide is first placed in the flask and the polycarboxylic acid is added to it with stirring. The reactants are heated to 200° C. and held at this temperature for about one hour. During this heating, $CO_2$ gas is bubbled through the reaction mixture. The reaction mixture is cooled to 150° C. and the epoxide compound is added to the reaction mixture. The mixture is then heated to a temperature of 200° C. over a period of 10 to 15 minutes. The reaction mixture is then cooled to about 100° C. and poured into about one to three times its weight of water to form either a solution or dispersion of the product.

In the following examples the ingredients are listed both on a weight basis and a molar ratio basis. The temperatures and times are the same as above unless otherwise stated.

EXAMPLE I

| Reactants | Molar ratio | Weight (grams) |
| --- | --- | --- |
| (1) Ethoxylated stearyl amine having an average molecular weight of 2470 (Ethomeen 18/60 sold by Armour and Company) | 1 | 988 |
| (2) Phthalic anhydride | 2 | 118.5 |
| (3) Epon 826 | 2 | 288 |

The reaction product has an epoxide equivalent of about 1390 and an average molecular weight of about 2800. It is a solid at room temperature and readily soluble in one to three times its weight of water. A curve obtained from a Perkin-Elmer Spectroscope test of the reaction product is shown and identified as Curve No. I in the single figure of the drawing.

EXAMPLE II

| Reactants | Molar ratio | Weight (grams) |
| --- | --- | --- |
| (1) Ethomeen 18/60 | 1 | 823.3 |
| (2) n-Dodecenyl succinic anhydride | 2 | 177.6 |
| (3) Epon 826 | 2 | 240 |

Reaction temperature is lowered to about 180° C. for addition of epoxide. The reaction product has an epoxide equivalent of about 1475 and an average molecular weight of about 3000. It is a dark, brown solid and is readily soluble in one to three times its weight of water. A curve obtained from a Perkin-Elmer Spectroscope test of the reaction product is shown in and identified as Curve No. II in the drawing.

EXAMPLE III

| Reactants | Molar ratio | Weight (grams) |
| --- | --- | --- |
| (1) Ethomeen 18/60 | 1 | 823.3 |
| (2) Octenyl succinic anhydride | 2 | 140.2 |
| (3) Epon 826 | 2 | 240 |

The procedure of Example II is followed. The epoxide equivalent of the reaction product is about 1383 and the average molecular weight of the reaction product is 2800. The reaction product is a dark, brown solid. The reaction product forms a solution in one to three times its weight of water. Spectrographic Curve III in the drawing represents the reaction product.

EXAMPLE IV

| Reactants | Molar ratio | Weight (grams) |
| --- | --- | --- |
| (1) Ethomeen 18/60 | 1 | 823.3 |
| (2) Chlorendic acid | 2 | 259.3 |
| (3) Epon 826 | 2 | 240 |

The reaction between Ethomeen 18/60 and chlorendic acid is conducted at 100° C. for one hour. After Epon 826 is added, the temperature of the reaction mixture is raised to 200° C. and then lowered by removal of heat. The reaction product has an estimated average molecular weight of 3300. The product is a dark, brown solid and forms a solution in one to three times its weight of water. Spectrographic Curve No. IV in the drawing illustrates the reaction product of this example.

EXAMPLE V

| Reactants | Molar ratio | Weight (grams) |
| --- | --- | --- |
| (1) Ethomeen 18/60 | 1 | 823.3 |
| (2) Tetrachlorophthalic anhydride | 2 | 190.6 |
| (3) Epon 826 | 2 | 240.0 |

Reaction between Ethomeen 18/60 and tetrachlorophthalic anhydride is conducted at 200° C. for one hour. The reaction mixture is lowered to 190° C. and the Epon 826 is added. The temperature of the reaction mixture is raised over a 15-minute period to 200° C. and then lowered to 150° C. over a 30-minute period by removal of heat. The reaction product has an estimated average molecular weight of 3100. The product is a dark, brown solid and forms a solution in one to three times its weight of water. Spectrographic Curve No. V in the drawing illustrates the reaction product of this example.

EXAMPLE VI

The procedure of Example I was followed with the same ingredients plus the addition of acrylic acid (2 molar ratio) to the final reaction product and further reaction at 200° C. for 0.1 hour. The reaction product has an epoxy equivalent of about 3062 and an average molecular weight of about 6100. The reaction product is a dark, brown solid and forms a solution in one to three times its weight of water at room temperature. Spectrographic Curve No. VI represents this reaction product.

EXAMPLE VII

| Reactants | Molar ratio | Weight (grams) |
| --- | --- | --- |
| (1) Ethomeen 18/60 | 1 | 2,470 |
| (2) Phthalic anhydride | 2 | 296.2 |
| (3) Vinyl cyclohexenediepoxide (EP-206) | 2 | 280 |
| (4) Resorcinol | 2 | 220.4 |

The procedure of Example I is followed except resorcinol is added to the final reaction product and the reaction mixture is heated for 30 minutes at 180° C. The epoxy equivalent of the reaction product is about 2733 and the average molecular weight of the reaction product is about 5400. The product is a dark, brown solid and is readily soluble in one to three times its own weight of water. Spectrographic Curve No. VII represents this reaction product.

EXAMPLE VIII

The procedure of Example I is followed with the exception that the epoxide compound used is 3,4-epoxy-6-methylcyclohexylmethyl, 3,4 - epoxy-6-methylcyclohexane carboxylate (EP–201). The epoxy equivalent of the reaction product is about 1283 and the average molecular dark, brown solid and is readily soluble in one to three times its own weight of water.

EXAMPLE IX

The procedure of Example I is followed with the exception that one mole of maleic anhydride is substituted for one of the two moles of phthalic anhydride. The phthalic anhydride is added first to the Ethomeen 18/60 and reacted at 200° C. for one-half hour. Then the maleic anhydride is added and the mixture is reacted for one-half hour at 200° C. The average epoxy equivalent of the reaction product is about 1187 and the average molecular weight of the reaction product is about 2400. The reaction product is a waxy, brown solid.

EXAMPLE X

The procedure of Example I is followed with the exception that EP–206 is used as the epoxide compound. The epoxy equivalent is about 1218 and the average molecular weight of the reaction product is approximately 2400. The product is a dark, brown solid and is readily soluble in one to three times its weight of water.

EXAMPLE XI

The procedure of Example I is followed with the exception that Dow 331 epoxide compound is used. The epoxy equivalent is about 1423 and the average molecular weight of the reaction product is about 2800. The product is a brown solid and is readily soluble in one to three times its weight of water.

EXAMPLE XII

The procedure of Example I is followed with the exception that Epon 1001 epoxide compound is used. The epoxy equivalent is about 2809 and the average molecular weight of the reaction product is about 5600. The product is solid at room temperature and is readily soluble in water.

EXAMPLE XIII

| Reactants | Molar ratio | Weight (grams) |
| --- | --- | --- |
| (1) Ethoxylated hydrogenated tallow acid amide having an average molecular weight of 2,478 (Ethomid HT/60 sold by Armour and Company) | 1 | 2,478 |
| (2) Phthalic anhydride | 2 | 296.2 |
| (3) Epon 826 | 2 | 720 |

The reaction product has an average molecular weight of 3000. The product is a dark, brown solid and is readily soluble in one to three times its weight of water.

EXAMPLE XIV

| Reactants | Molar ratio | Weight (grams) |
| --- | --- | --- |
| (1) Ethoxylated cocoamine having an average molecular weight of 860 (Ethomeen C/25 sold by Armour and Company) | 1 | 860.0 |
| (2) Phthalic anhydride | 2 | 296.2 |
| (3) Epon 826 | 2 | 720.0 |

The reaction product has an average molecular weight of about 900. The product is a viscous liquid and is not readily soluble in water. A surfactant or wetting agent is needed in order to make the reaction product soluble in water.

EXAMPLE XV

The procedure of Example I is followed using a reaction product produced by reacting 108 grams of stearyl amine with 880 grames of ethylene oxide in an autoclave at a pressure of 150 pounds per square inch and at a temperature of 65° C. for 12 hours. The reaction product has an approximate molecular weight of 2470 and is a waxy solid. Thereafter the reaction procedure of Example I is followed to produce the reaction product of Example I.

The aqueous sizing composition is formulated so that it contains from about 2 to 15 percent by weight of the previously described reaction product. The sizing composition may also contain from about 0.3 to about 2.0 percent by weight of a coupling agent and from about 0.1 to 1 percent by weight of a wetting agent.

Coupling agents which may be used in the aqueous size compositions in the practice of this invention include silane and siloxane materials. For example, hydrolyzable vinyl, allyl, beta chloropropyl, phenyl, thio-alkyl, thio-alkaryl, amino-alkyl, methacrylate, epoxy and mercapto silanes, their hydrolysis products and polymers of the hydrolysis products and mixtures of any of these are suitable for such use. Some of the silanes are disclosed in U.S. Patents Nos. 2,563,288, 2,688,006, 2,688,007, 2,723,-211, 2,742,378, 2,754,237, 2,776,910, 2,799,598, 2,832,-754, 2,930,809, 2,946,701, 2,952,576, 2,974,062, 3,044,-982, 3,045,036, 3,169,884, 3,207,623 and 3,211,684, the disclosures of which are incorporated herein by reference.

Another class of coupling agents which has been found to be useful are the basic (hydroxy containing) metal salts of a strong mineral acid, such as, for example, a basic chromium chloride, basic chromium sulfate, etc. These compounds are ones having a trivalent metal ion selected from the group consisting of chromium, cobalt, nickel, copper and lead, at least one hydroxyl group attached to the metal, and at least one anion of a strong mineral acid attached to the metal (as well as coordinate complexes of these compounds and mixtures thereof).

Another type of coupling agent which may be used in the practice of this invention is a complex compound of the Werner type in which a trivalent nuclear atom, such as chromium, is coordinated with an organic acid such as methacrylic acid, i.e., a methacrylic acid complex of chromic chloride. Such agents are described in U.S. Patent No. 2,611,718.

Mixtures of two or more of any of these coupling agents may be used.

The size may contain a wetting agent. The wetting agent is preferably cationic or non-ionic and it may also serve as a lubricant. Any material which is conventionally known to be useful as such and will reduce the surface tension of the sizing solution so that it is about 25 to 35 dynes per square centimeter can be used. Such materials include cetyl or stearyl monoamine hydrochloride or acetate, dodecyl amine, hexadecyl amine and secondary and tertiary derivatives of the same, for example, dodecyl methylamine and salts thereof. Other examples of suitable wetting agents are polyoxyethylene derivatives of a sorbitol fatty acid ester such a polyoxyethylene sorbitan monostearate or polyoxyethylene sorbitan trioleate. The amount of such wetting agent employed generally ranges from about 0.01 to 1 percent by weight of the aqueous sizing solution.

The total solids (non-aqueous) content of the sizing solution is about 2 to 15 percent by weight of the solution. In all events the amounts of the various ingredients should not exceed that amount which will cause the viscosity of the solution to be greater than about 100 centipoises at 20° C. Solutions having a viscosity of greater than 100 centipoises at 20° C. are very difficult to apply to glass fiber strands during their formation without breaking the strand. It is preferred that the viscosity of the size be between 1 and 20 centipoises at 20° C. for best results. The pH of the solution may generally vary from about 3 to 8. Typical examples of the size are as follows:

EXAMPLE XVI

| Ingredients: | Parts by weight |
|---|---|
| (1) Reaction product of Example I | 250 |
| (2) Water | 4481 |

EXAMPLE XVII

| | |
|---|---|
| (1) Reaction product of Example I | 250 |
| (2) Triton X–100 (isooctyl phenyl polyethoxy ethanol sold by Rohm and Haas) | 25 |
| (3) Water | 4456 |

EXAMPLE XVIII

| | |
|---|---|
| (1) Reaction product of Example II | 250 |
| (2) Arquad S–50 (n-alkyl trimethyl ammonium chloride sold by Armour Industrial Chemical Company) | 25 |
| (3) Water | 4456 |

EXAMPLE XIX

| | |
|---|---|
| (1) Reaction product of Example I | 250 |
| (2) Gamma-aminopropyl triethoxysilane (A–1100 sold by Union Carbide) | 25 |
| (3) Water | 4456 |

EXAMPLE XX

| | |
|---|---|
| (1) Reaction product of Example I | 250 |
| (2) Glycidoxypropyltrimethoxy silane (DC–Z–6040 sold by Dow Corning Company) | 25 |
| (3) Water | 4456 |

EXAMPLE XXI

| | |
|---|---|
| (1) Reaction product of Example I | 250 |
| (2) n - (Trimethoxysilylpropyl) ethylene diamine (DC–Z–6020 sold by Dow Corning Company) | 25 |
| (3) Water | 4456 |

EXAMPLE XXII

| | |
|---|---|
| (1) Reaction product of Example I | 250 |
| (2) Methacrylato silane (DC–Z–6030 sold by Dow Corning Company) | 25 |
| (3) Water | 4456 |

EXAMPLE XXIII

| | |
|---|---|
| (1) Reaction product of Example I | 500 |
| (2) A–1100 | 100 |
| (3) Triton X–100 | 50 |
| (4) Water | 8813 |

EXAMPLE XXIV

| | |
|---|---|
| (1) Reaction product of Example XI | 500 |
| (2) A–1100 | 100 |
| (3) Triton X–100 | 50 |
| (4) Water | 8813 |

The reaction product has also been found to be useful as an emulsifying agent for aqueous epoxy resin emulsions. The following example illustrates the use of the reaction product of this invention with an epoxy resin in a glass fiber forming size.

EXAMPLE XXV

| Ingredients: | Parts by weight |
|---|---|
| (1) Epon 826 | 476.0 |
| (2) Reaction product of Example I | 95.3 |
| (3) DC–Z–6040 | 95.3 |
| (4) Polyvinyl pyrrolidone | 95.3 |
| (5) Water | 8701.0 |

The sizing solutions listed above are prepared and applied to the individual glass fibers during their formation in the conventional manner. The sizing solution is applied to the individual fibers just after their emergence from orifices in an electrically heated, platinum alloy bushing containing molten glass. The sizing solution is applied to the filaments prior to the time they are grouped together to form a strand by means of a roller applicator which is partially submerged in the sizing solution contained in a reservoir. Such an applicator is shown in more detail in U.S. Patent No. 2,728,972. The fibers are grouped into a strand by a graphite guide and wound around a forming tube rotating at approximately 7500 r.p.m. to produce a strand travel of approximately 12,000 to 15,000 feet per minute. Other methods of applying th size to the strand of glass fibers, such as a pad applicator, may be employed and the strand may be formed by means other than winding on the forming tube, such as by means of a pair of rotating wheel pullers which direct the strand into a suitable collecting device.

The glass fiber strands wound on the forming tube are then dried. This may be done by heating them at a temperature and for a length of time sufficient to remove substantially all of the water, for example, at about 270° F. for 8 hours. This drying causes the coupling agents to fix themselves to the glass surface and to produce the degree of strand integrity required for forming the strand into a woven cloth or woven roving. The solids content of size on the strands averages about 0.2 to 2.0 percent by weight, preferably about 0.50 percent by weight.

Glass strands sized with the solution described in Example XIX above were also subjected to the Naval Ordnance Laboratory's Split D Ring Test. This test consists of winding glass strands saturated with resin into a cylindrical form approximately six inches in diameter. The glass plastic cylinder is cured for 16 hours at 250° F. and for an additional 4 hours at 360° F. After curing, ring sections six inches in diameter, one-quarter inch wide, and one-eighth inch thick are cut from the cylinder. These are tested for tensile strength by placing two D-shaped members within the ring and causing the D-shaped members to be pulled in diametrically opposing directions until the filament wound ring breaks.

E-glass strands sized with the formulation described in Example XIX were saturated with epoxy resin and tested in accordance with the Naval Ordnance Laboratory's Split D Ring Test Procedure. These had an average dry ultimate tensile strength of 249,000 pounds per square inch. Other rings, similarly prepared, after immersion in boiling water for 3 hours and tested in the same manner had an average ultimate tensile strength of 234,000 pounds per square inch. For comparative purposes, presently commercially available E-glass strands subjected to the same fabrication and testing technique with the exception that they were sized with an epoxy compatible size formulation rather than the formulation described in Example XIX had an average dry ultimate tensile strength of only 230,000 pounds per square inch, and samples immersed in boiling water for 3 hours had an average ultimate tensile strength of only 205,000 pounds per square inch. E-glass strands sized with the formulation described in Example XXV were saturated with epoxy resin and tested with the Naval Ordnance Laboratory's Split D Ring Test Procedure had an average dry ultimate tensile strength of 253,000 pounds per square inch and an average wet ultimate tensile strength of 236,000 pounds per square inch.

However, increased physical strength, although an important and significant factor, represents only one benefit to be derived through the use of the subject sizes. Other equally beneficial and desirable aspects are the versatility and economic advantages obtained through the use of these sizes. Prior to introducing cloth woven from fiber glass strands having starch based sizes thereon into resins for reinforcement purposes, it is necessary to remove the size by literally burning it off in a heat cleaning process and subsequently apply a coupling agent to the filaments to serve as a "coupler" between the reinforcing fibers and the resin. These additional treatments involve a substantial investment in equipment and additional expense in maintenance and operation of such equipment. One substantial benefit obtained through the use of the size formulations disclosed in the preceding examples is that one need not subject fiber glass cloth woven from yarn treated with these sizes to the costly heat cleaning and coupling agent treatments. One need only take the cloth woven from fiber glass yarns treated with the subject sizes, saturate it with the desired resin and shape or form said saturated cloth to whatever configuration is desired by conventional molding or laminating techniques. Thus, fabricators manufacturing resinous articles reinforced with fiber glass cloth can, through the use of cloth woven from fiber glass yarn treated with the subject sizes, produce such reinforced articles with either polyester or epoxy resins without suffering the expense of heat cleaning or coupling agent treatments.

The sized strands herein described are particularly useful as a reinforcement for rubber. In such use, a plurality of ends of strand or yarn are combined and coated with a rubber adhesive. The coated ends are twisted and then plied with other coated ends to form a coated cord. For example, five ends of ECG-75's with a one-half turn twist may be combined and coated and impregnated with a rubber latex adhesive. The coated ends are heated to dry the adhesive and fix it on the combined ends of yarn. The coated ends are then twisted to impart a 4Z twist. The twisted ends are then plied with other twisted ends to give a balanced 3.0S plied cord. Typical cords are 5/4 for belt reinforcement and 5/3 for tire reinforcement. The cords are used as such or in a loosely woven fabric form. The fabric is used in the belt portion of radial ply tires.

It has been found that different adhesives must be used with different synthetic fibers to get maximum properties in different rubber stocks. A satisfactory adhesive for glass fibers and rubber is a mixture of resorcinol, formaldehyde and a terpolymer of butadiene, styrene and vinyl pyridine such as shown in U.S. Patent No. 2,817,616. Other suitable formulations are described in U.S. Patents Nos. 2,691,614 and 2,822,311. The formulation of a suitable rubber adhesive and the coating of glass fiber strand and yarn therewith are described in the following example:

EXAMPLE XXVI

A rubber adhesive is prepared from the following ingredients:

| Ingredient | Parts by weight |
|---|---|
| Resorcinol | 352 |
| $CH_2O$ (37%) aqueous solution | 518 |
| NaOH | 9.6 |
| Butadiene-styrene-vinyl pyridine terpolymer latex (Gen-Tac 41% solids dispersed in $H_2O$) | 7800 |
| $NH_4OH$ (28% $NH_3$ in $H_2O$) | 362 |
| $H_2O$ | 9572 |

These ingredients are mixed in the following manner. The Gen-Tac terpolymer latex is mixed with 1940 parts by weight of water. Water (7632 parts by weight) is added to a separate container. NaOH is then added and dissolved in the water in the separate container. Resorcinol is next added to the aqueous solution of NaOH and dissolved therein. Formaldehyde is added after the resorcinol and the mixture is stirred for 5 minutes and allowed to age at room temperature for two to six hours. The aging permits a small amount of condensation of resorcinol and formaldehyde and provides superior "H" test adhesion of the subsequently coated yarn to the rubber stock. After aging, this mixture is added to the Gen-Tac latex and the resultant mixture is stirred slowly for 15 minutes. Ammonium hydroxide is then added and the mixture is stirred slowly for 10 minutes. The ammonium hydroxide inhibits further condensation of the resorcinol formaldehyde.

Glass fiber strands sized as described in Example XIX were coated and impregnated with the adhesive produced as above described. Five strands (ECG-75's) with one-half turn per inch of twist are combined in parallel relation and passed under slight tension through grooves in rotating rollers which are partially suspended in the adhesive. The pickup of adhesive is sufficient to provide a coating on the strands of about 10 to 25 percent by weight of adhesive based upon the weight of strands. Fifteen percent (15%) by weight of adhesive has been found to be suitable for most purposes.

Thereafter, the coated strands are passed vertically through a dielectric or microwave drying oven to remove the water and $NH_3$ from the adhesive. During this removal the strands appear to vibrate vigorously and further impregnation of the adhesive into the strands and onto and around the individual fibers is achieved. The coated strands next pass upwardly through a gas oven maintained at a temperature of about 350° F. to 500° F. to effect curing of the resorcinol formaldehyde. Further flowing and impregnating of the adhesive is accomplished during this second heating step. The curing or condensing of the resorcinol formaldehyde is free to proceed with the removal of the $NH_3$. The condensation is time-temperature dependent. For example, heating the coated strands for 30 seconds at 370° F. or 20 seconds at 420° F. is satisfactory. Apparatus suitable for performing the two-step heat treatment is shown in U.S. Patent No. 2,865,790.

The two-step drying and curing process provides improved uniformity and impregnation of the coating on the strands. This is evidenced by a uniformity of amount and coloring of the coating on the strands and the absence of "flags" or lumps of adhesive along the length of the coated strand as is the case with conventional coating techniques. This in turn provides markedly improved "flex life" of the rubber product which is reinforced with the coated strands. The two-step coating process also permits coating of the adhesive at a much faster rate than conventional coating processes which do not utilize the dielectric or microwave drying step.

Experimentation is usually necessary to determine the optimum cord construction and adhesive for the particular rubber product. In this experimentation, various screening tests are utilized to determine the properties of the reinforced rubber. The "H-Adhesion" test is a standard rubber industry test designated as ASTM-D-2138-62T issued in 1964.

The following rubber compounds were reinforced with glass fiber cord of ECG-75 5/3 3.50Z x 3.0S construction and tested. The individual fibers were formed and sized as described in Example XIX and the strands were coated as described in Example XXVI. The chemical identification of the ingredients in the rubber compound can be found in Materials and Compounding Ingredients for Rubber and Plastics published by Rubber World.

EXAMPLE XXVII

| Ingredients: | SBR-natural rubber blend |
|---|---|
| SBR 1500 | 75 |
| No. 1 RSS (Rubber smoked sheet) | 25 |
| HAF Black | 50 |
| ZnO | 5 |
| Stearic Acid | 1 |
| Age-Rite Resin (antioxidant) | 1 |
| Sundex 790 (plasticizer) | 10 |
| Santocure (accelerative) | 1 |
| DOTG | 0.2 |
| Sulfur | 2.0 |

"H-Adhesion" Test at 230° F. for 30 minutes (Average 30–35 pounds).

Additional adhesive compositions which have been utilized in the practice of the invention are as follows:

EXAMPLE XXVIII

An adhesive dip composition especially useful for cords which are to reinforce natural rubber and SBR stocks is as follows.

Ingredients: Parts by weight
- Butadiene-styrene latex (70% butadiene, 30% styrene by weight) — 7800
- Resorcinol — 350
- Formaldehyde — 518
- NaOH — 9.6
- Water — 9572

This adhesive dip is prepared in the same manner as the adhesive in Example XXVI with the exception that $NH_4OH$ is omitted. The latex appears to act as a sufficient inhibitor to condensation of the resorcinol and formaldehyde to permit absence of $NH_4OH$.

EXAMPLE XXIX

An adhesive dip composition especially useful for cords which are to reinforce Neoprene rubber stock is as follows:

| Ingredient | Percent solids | Parts by weight |
|---|---|---|
| Neoprene latex (Dupont latex 460) | 46 | 6,300 |
| MgO | 33 | 315 |
| Tergitol anionic (surfactant-stabilizer) | | 63 |
| Neozone-D (Antioxidant which prevents breakdown of Neoprene at high temperature, B-phenylnaphthyl (amine)) | 50 | 126 |
| ZnO | 50 | 315 |
| Resorcinol | | 99 |
| Formaldehyde | 37 | 145.8 |
| NaOH | | 36 |
| $H_2O$ | | 2,145.6 |

This adhesive is prepared in the same manner as in Example XXVI and is aged for 24 hours at room temperature before use.

EXAMPLE XXX

An adhesive dip composition especially useful for Neoprene rubber stock is as follows:

| Ingredient | Percent solids | Parts by weight |
|---|---|---|
| Neoprene latex (Dupont latex 460) | 46 | 4,176 |
| Butadiene-styrene-vinyl pyridine latex | 41 | 1,171 |
| MgO | 33 | 315 |
| $NH_4OH$ | 28 | 271 |
| Resorcinol | | 264 |
| Formaldehyde | | 389 |
| NaOH | | 7.2 |
| $H_2O$ | | 12,570 |

The adhesive dip composition is prepared in the same manner as described in Example XXVI.

Although the present invention has been described with respect to specific details of certain embodiments thereof, it is not intended that such details act as limitations upon the scope of the invention except insofar as set forth in the accompanying claims.

We claim:

1. A reaction product obtained by reacting an alkoxylated nitrogen containing compound selected from the group consisting of an alkoxylated fatty amine and an alkoxylated fatty amide with a polycarboxylic acid and then reacting the resulting product with an epoxide compound.

2. The reaction product of claim 1 which is obtained by esterifying the alkoxylated nitrogen containing compound by reacting it with a polycarboxylic acid whereby at least one unesterified carboxyl group remains and thereafter esterifying the unesterified carboxyl group of said ester reaction product by reacting it with an epoxide compound.

3. The reaction product of claim 1 which is obtained by reacting one mole of the alkoxylated nitrogen containing compound with two moles of a polycarboxylic acid whereby unesterified carboxyl groups remain and thereafter esterifying the unesterified carboxyl groups with two moles of an epoxide compound.

4. The reaction product of claim 1 wherein the alkoxylated nitrogen containing compound is selected from the group consisting of:

(1)
$$RN\begin{Bmatrix}(CH_2CH_2O)_xH\\(CH_2CH_2O)_yH\end{Bmatrix}$$

and (2)
$$R\overset{O}{\overset{\|}{C}}-N\begin{Bmatrix}(CH_2CH_2O)_xH\\(CH_2CH_2O)_yH\end{Bmatrix}$$

wherein R is a fatty alkyl group containing from 12 to 18 carbon atoms and $x$ and $y$ are 1 to 100.

5. The reaction product of claim 2 wherein the alkoxylated nitrogen containing compound is selected from the group consisting of:

(1)
$$RN\begin{Bmatrix}(CH_2CH_2O)_xH\\(CH_2CH_2O)_yH\end{Bmatrix}$$

and (2)
$$R\overset{O}{\overset{\|}{C}}-N\begin{Bmatrix}(CH_2CH_2O)_xH\\(CH_2CH_2O)_yH\end{Bmatrix}$$

wherein R is a fatty alkyl group containing from 12 to 18 carbon atoms and $x$ and $y$ are 1 to 100.

6. The reaction product of claim 5 wherein the epoxide compound is a polyepoxide.

7. A glass fiber strand forming size consisting essentially of 2 to 15 percent by weight of the reaction product of claim 1 in an aqueous carrier, the viscosity of the size being less than 100 centipoises at 20° C.

8. A size as described in claim 7 containing 0.3 to 2 percent by weight of a coupling agent.

9. A size as described in claim 7 containing 0.1 to 1 percent by weight of a glass fiber wetting agent.

10. A glass fiber forming size as described in claim 7 consisting essentially of 2 to 15 percent by weight of the reaction product of claim 6.

11. In the method of forming a glass fiber strand which can be used as a reinforcement for resins and rubber which comprises drawing glass streams through orifices in a bushing to form individual glass fibers, moving the fibers away from the bushing at a high rate of speed and forming them into a strand, applying to the fibers while they are moving at this speed an aqueous sizing solution, drying the sized glass fibers and preparing them for use as a reinforcement, the improvement which comprises utilizing the aqueous sizing solution described in claim 7.

12. The method of claim 11 which utilizes the size described in claim 8.

13. The method of claim 11 which utilizes the size described in claim 9.

14. The method of claim 11 which utilizes the size described in claim 10.

15. The method of claim 11 wherein the sized strand is further prepared for rubber reinforcement by coating it with an aqueous rubber adhesive composition containing a rubber latex and a heat curable resin, the adhesive coated strand is dried by means of high frequency electrical energy to remove the water and the resin is thereafter cured by the application of additional heat.

16. The method of claim 15 which utilizes the size described in claim 8.

17. The method of claim 15 which utilizes the size described in claim 9.

18. The method of claim 15 which utilizes the size described in claim 10.

19. Glass fiber strand formed according to the method of claim 11.
20. Glass fiber strand formed according to the method of claim 12.
21. Glass fiber strand formed according to the method of claim 13.
22. Glass fiber strand formed according to the method of claim 14.
23. Glass fiber strand formed according to the method of claim 15.
24. Glass fiber strand formed according to the method of claim 16.

References Cited

UNITED STATES PATENTS

| | | |
|---|---|---|
| 3,167,468 | 1/1965 | Lovelace et al. _____ 161—175 |
| 3,249,412 | 5/1966 | Kolek et al. _____ 65—3 |

ROBERT F. BURNETT, Primary Examiner

LINDA M. CARLIN, Assistant Examiner

U.S. Cl. X.R.

57—153; 65—3; 117—80, 126; 161—175; 260—78, 835

PO-1050 (5/69)

UNITED STATES PATENT OFFICE
CERTIFICATE OF CORRECTION

Patent No. 3,459,585          Dated August 5, 1969

Inventor(s) Charles W. Killmeyer and George E. Eilerman

It is certified that error appears in the above-identified patent and that said Letters Patent are hereby corrected as shown below:

In Column 8, line 72,

"220.4" should read -- 220.2 --

In Column 9, line 12, after "molecular", the following words have been omitted,

-- weight of the reaction product is 2500. The product is a --

SIGNED AND
SEALED
APR 28 1970

(SEAL)
Attest:

Edward M. Fletcher, Jr.
Attesting Officer

WILLIAM E. SCHUYLER, JR.
Commissioner of Patents